US011376586B2

(12) United States Patent
Felsberger et al.

(10) Patent No.: US 11,376,586 B2
(45) Date of Patent: Jul. 5, 2022

(54) SENSOR CASSETTE

(71) Applicant: ERBA TECHNOLOGIES AUSTRIA GMBH, Graz (AT)

(72) Inventors: Robert Felsberger, Graz (AT); Gerhard Schlembacher, Stallhofen (AT); Martin Hackl, Graz (AT); Sebastian Reif, Kumberg (AT); Arne Sieber, Graz (AT); Dietmar Wierkl, Graz (AT)

(73) Assignee: ERBA TECHNOLOGIES AUSTRIA GMBH, Graz (AT)

( * ) Notice: Subject to any disclaimer, the term of this patent is extended or adjusted under 35 U.S.C. 154(b) by 253 days.

(21) Appl. No.: 16/761,909

(22) PCT Filed: Nov. 6, 2018

(86) PCT No.: PCT/AT2018/000089
§ 371 (c)(1),
(2) Date: May 6, 2020

(87) PCT Pub. No.: WO2019/090370
PCT Pub. Date: May 16, 2019

(65) Prior Publication Data
US 2020/0316594 A1    Oct. 8, 2020

(30) Foreign Application Priority Data
Nov. 10, 2017    (AT) .................................. A 439/2017

(51) Int. Cl.
*B01L 3/00*        (2006.01)
*B29C 45/16*       (2006.01)

(52) U.S. Cl.
CPC ... *B01L 3/502715* (2013.01); *B01L 3/502707* (2013.01); *B29C 45/1676* (2013.01);
(Continued)

(58) Field of Classification Search
CPC ..... B01L 2200/0689; B01L 2300/0645; B01L 2300/0816; B01L 2300/123; B01L 3/502707; B01L 3/502715; B29C 45/1676
See application file for complete search history.

(56) References Cited

U.S. PATENT DOCUMENTS 6,001,228 A * 12/1999 Huber .................. G01N 27/283
                                                      435/288.5
2006/0000722 A1   1/2006 Parce et al.
(Continued)

FOREIGN PATENT DOCUMENTS

EP    1525918 A2    4/2005
EP    1905514 A1    4/2008
(Continued)

OTHER PUBLICATIONS

International Search Report dated Feb. 14, 2019 issued in corresponding International Application No. PCT/AT2018/000089 with English translation (6 pages).
(Continued)

*Primary Examiner* — Jennifer Wecker
*Assistant Examiner* — Jonathan Bortoli
(74) *Attorney, Agent, or Firm* — Pillsbury Winthrop Shaw Pittman, LLP

(57) ABSTRACT

A sensor cassette insertable into an analysis module for carrying out electrochemical measurement processes in sample fluids, including a sensor carrier which is essentially planar and carries electrochemical sensor elements for determining chemical and/or physical parameters of the sample fluids. The sensor elements are connected to conductor tracks formed on the sensor carrier. A cover part is arranged on the sensor carrier, in which at least one groove-shaped measuring channel that is intended for the flow of the sample fluid and opens towards the sensor carrier is formed, which measuring channel is connected to at least one electrochemi-
(Continued)

Figure 1:
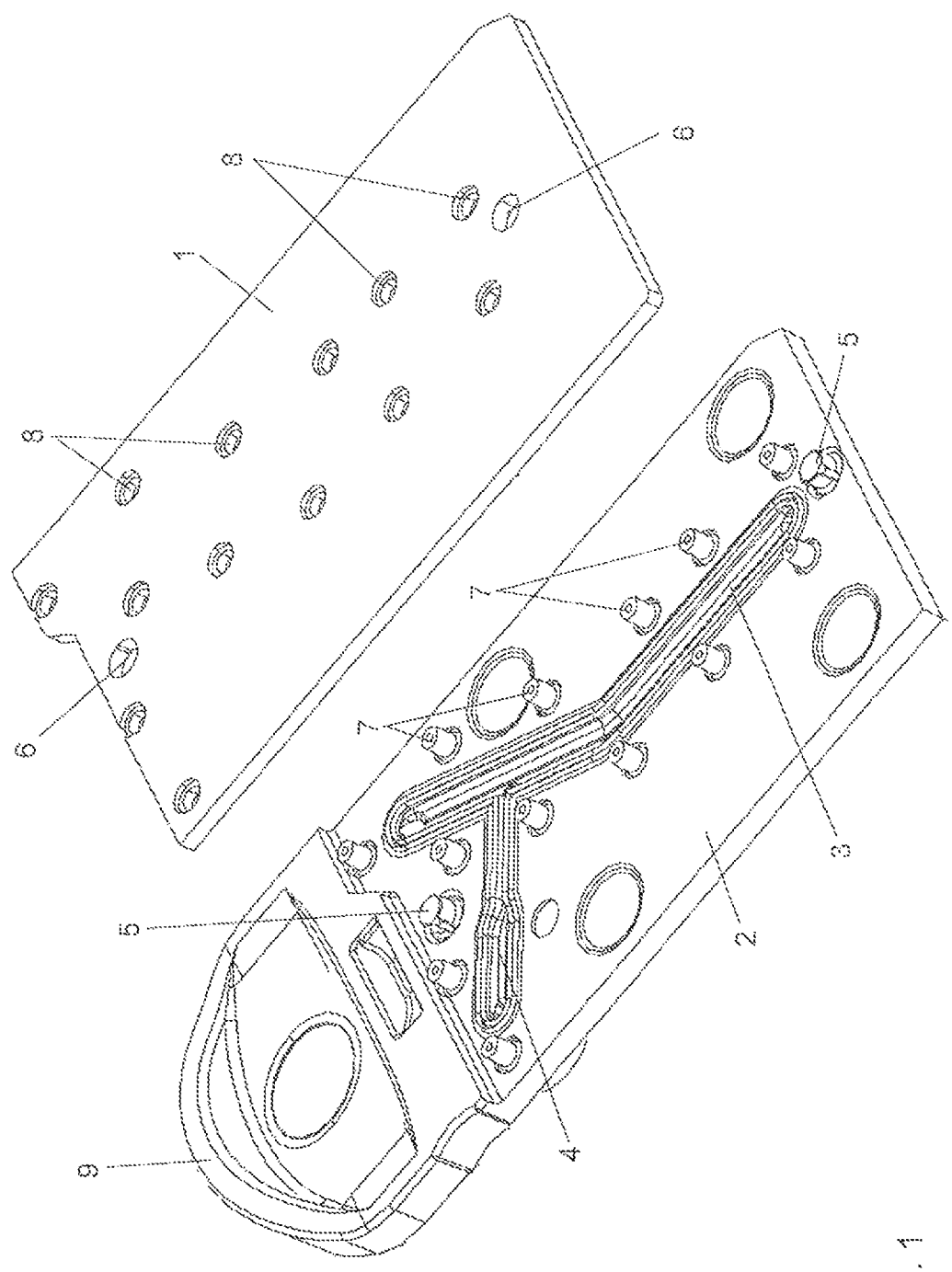

cal sensor element and is fluidly connected to at least one fluid connector arranged on the side facing away from the sensor carrier. The cover part is a two-component injection molded part having a hard component and a soft, component. The measuring channel is formed in the soft component over its entire length.

19 Claims, 6 Drawing Sheets

(52) U.S. Cl.
CPC .............. *B01L 2200/0689* (2013.01); *B01L 2300/0645* (2013.01); *B01L 2300/0816* (2013.01); *B01L 2300/123* (2013.01)

(56) References Cited

U.S. PATENT DOCUMENTS

2009/0156966 A1\* 6/2009 Kontschieder ... G01N 33/48771
600/584

2011/0036162 A1\* 2/2011 Holoch ................. G01F 1/6845
73/273

2017/0120240 A1 5/2017 Delamarche et al.

FOREIGN PATENT DOCUMENTS

| | | |
|---|---|---|
| EP | 2653285 A1 | 10/2013 |
| WO | 2004/024326 A1 | 3/2004 |
| WO | 2009/024589 A1 | 2/2009 |
| WO | 2017/044527 A1 | 3/2017 |
| WO | 2017/091618 A1 | 6/2017 |
| WO | 2018/065110 A1 | 4/2018 |

OTHER PUBLICATIONS

International Preliminary Report on Patentability dated Oct. 16, 2019 issued in corresponding International Patent Application No. PCT/AT2018/000089 (15 pages).

\* cited by examiner

SENSOR CASSETTE

CROSS-REFERENCE TO RELATED APPLICATIONS

This application is a national stage entry of PCT/AT2018/000089, filed Nov. 6, 2018, which claims priority to Austrian Patent Application No. A 439/2017, filed Nov. 10, 2017, the entire contents of both of which are herein incorporated by reference in their entireties.

The invention refers to a sensor cassette insertable into an analysis module for carrying out in particular electrochemical measurement processes in sample fluids, in particular body fluids or sample fluids obtained by preanalytical preparation of body fluids or of biological sample material, comprising a sensor carrier which is essentially planar and carries a plurality of in particular electrochemical sensor elements for determining chemical and/or physical parameters of the sample fluids, which sensor elements are connected to conductor tracks formed on the sensor carrier, and comprising a cover part (2) arranged on the sensor carrier, in which at least one groove-shaped measuring channel that opens towards the sensor carrier is formed, which measuring channel is intended for the flow of the sample fluid, is connected to at least one in particular electrochemical sensor element of the sensor carrier and is fluidly connected to at least one fluid connector arranged on the side facing away from the sensor carrier.

The invention further relates to a device for carrying out in particular electrochemical measurement processes in sample fluids, comprising an inventive sensor cassette and an analysis module having at least one cassette holder for receiving the sensor cassette, wherein the sensor cassette in its state received in the cassette holder is movable along a movement path between a first and a second position, wherein the sensor cassette is fluidly and electrically separated from the analysis module in the first position and is fluidly and electrically connected to the analysis module in the second position.

Measuring systems for determining several parameters in body fluids are important components of clinically relevant analysis methods. The main focus here is on rapid and precise measurement both in the context of clinical in-vitro laboratory diagnostics and point-of-care testing. Point-of-care testing (short: POCT) means diagnostic examinations that take place directly at the site of the patient examination, such as in the hospital ward of a hospital, in intensive care units, in anesthesia, in outpatient clinics, in the practice of a private practice Doctor or during an ambulance. POCT has the advantage that the results are available after a short time, because on the one hand there is no need to transport the samples to a specialized laboratory and on the other hand there is no need to take into account the time schedule of the laboratory.

With POCT analyzers according to the prior art, it is possible to measure several individual parameters in a single measurement process. For this purpose, a sample amount of the sample fluid to be examined, in particular whole blood, serum, plasma, urine or a sample fluid obtained by preanalytical preparation of body fluids or of biological sample material, is fed to a measuring channel in which the sample amount comes into contact with sensor elements. Several different sensor elements can be combined into groups of sensor elements (sensor arrays), which are arranged on a common carrier.

A sensor element is understood here to mean a measuring arrangement which can serve to determine chemical and/or physical parameters of the sample fluids. A wide variety of measurement methods can be used, such as electrochemical, optical, photometric/spectroscopic or electro-optical measurement methods (such as electrochemiluminescence), using appropriate sensor elements such as electrodes, optodes or the like. Within the scope of the invention, electrochemically operating sensor elements are particularly preferred. The sensor elements can be designed to measure values of the blood gases ($O_2$, $CO_2$), the pH value, the concentration of electrolytes ($Li^+$, $Na^+$, $K^+$, $Mg^{++}$, $Ca^{++}$, $Cl^-$, $H^+$, $NH_4$), the concentration of metabolites (glucose, lactate, urea, creatinine), the values of the hemoglobin derivatives ($O_2Hb$ (oxyhemoglobin), HHb (deoxyhemoglobin), COHb (carboxyhemoglobin), MetHb (methaemoglobin)) and bilirubin, the hematocrit value, kidney function values, blood coagulation values, markers for cardiac diseases, proteins, nucleic acids, peptides and other measured values.

For the electrochemical determination of the concentration or activity of an ion or electrolyte dissolved in the sample fluid to be examined, ion-selective electrodes have long been used, which are applied, for example, by means of thin-film technology or thick-film technology on a planar sensor carrier. In this case, a concentration-dependent voltage can be measured between the ion-selective electrode in contact with the sample fluid to be examined and a reference electrode, wherein the voltage can be tapped via conductor tracks formed on the sensor carrier.

For a long time, amperometric sensors or electrochemical impedance sensors have also been used for the electrochemical determination of the concentration or activity of blood gases, metabolites and other biochemical parameters (such as proteins, nucleic acids, peptides, etc.) dissolved in the body fluid to be examined, as well as other markers and measured values, said impedance sensors being applied to a planar sensor carrier, for example by means of thin-film technology or thick-film technology. A concentration-dependent current or a concentration-dependent impedance can be measured between the sensor electrode that is in contact with the sample fluid to be examined and a counter electrode, wherein the electrochemical signals can be tapped via conductor tracks formed on the sensor carrier.

In order to enable POCT applications, it is known to integrate the sensor elements in a sensor cassette which is exchangeably received in an analysis module. The sensor cassette comprises the sensor carrier and a cover part arranged thereon, in which at least one measuring channel is formed, which is used to convey the sample fluid to be examined. The sample fluid contacts the sensor elements along the measurement channel, so that corresponding measurement values can be obtained immediately, which are evaluated and processed in the analysis module, so that corresponding results can be output. The sensor cassette can only be used for a defined number of measuring processes and must then be replaced by a new sensor cassette.

In order to enable the largest possible number of measurement processes and the longest possible service life, high demands are placed on the sensor cassette:

Reliable sealing of the measuring channel
Avoidance of dead spaces and gaps in the fluid path
Avoidance of carry-over and cross-contamination between different measurements
Prevention of biofilm formation on the parts that come into contact with the fluid The present invention aims to further develop a sensor cassette and a measuring device comprising a sensor cassette and an analysis module in such a way that the above-mentioned requirements can be met. Furthermore, the invention aims to enable the sensor cassette to be produced as inexpensively and as automatically as possible.

To achieve this object, the invention essentially consists in a sensor cassette of the type mentioned at the outset, wherein the cover part is designed as a two-component injection-molded part comprising a hard component and a soft component, the at least one measuring channel being formed in the soft component over its entire length. Because the at least one measuring channel is entirely embodied in the soft component of a two-component injection-molded part, it can be formed in one piece, so that dead spaces and gaps as well as carry-over and cross-contamination between different measurements can be avoided in a simple manner. In addition, the cover part can be produced in one piece in a single production process, namely by a two-component injection molding process, so that cost-effective production with short cycle times is ensured using tried and tested tools and materials. In the case of the arrangement of two or more measuring channels, if the measuring channel geometry is selected such that the measuring channels are connected to one another or open into one another, these can advantageously also be formed in one piece with one another.

The design of the measuring channel as a soft component of a two-component injection molded part also allows the sealing of the at least one measuring channel against the sensor carrier to be formed in one piece with the measuring channel. In this context, a preferred embodiment provides that the soft component comprises sealing lips that interact with the sensor carrier to seal the at least one measuring channel. The sealing lips are preferably designed as a structure that completely surrounds the at least one measuring channel, so that all-round sealing is ensured. The sealing lips are preferably designed such that, in the undeformed state, they protrude from the surface of the cover part facing the sensor carrier. The sealing lips have, for example, a V-shaped profile, wherein preferably a profile with two adjacent elevations, in particular a W-shaped profile, is provided. When pressed onto the sensor carrier, the sealing lip is deformed in such a way that a tight seal is ensured.

A particularly advantageous embodiment provides that the soft component also forms the at least one fluid connector, which is preferably designed to form at least one internal annular sealing element, the at least one measuring channel and the at least one fluid connector being formed in one piece with one another. As a result, all areas of the cover part with which the sample fluid comes into contact on its way from the fluid inlet via the measuring channel to the fluid outlet are formed by the soft component and therefore in one piece. This minimizes material transitions and interfaces, such as gaps in the area of the channels, as well as the number of different materials that come into contact with the fluid, which on the one hand reduces opportunities for leaks and on the other hand reduces possible dead spaces and gaps that lead to contamination, biofilm formation, carryover and cross-contamination between different measurements. The formation of an internal annular sealing element or a sealing ring in the fluid connector allows a better and denser connection to a corresponding fluidic connection element which is provided on an analysis module for use with the sensor cassette according to the invention.

A hard and a soft component are understood in the context of the invention to be plastics which can be processed by injection molding, the hard and soft components differing in their hardness (measured in HR or HV), i.e. in the mechanical resistance which the respective component opposes to the mechanical penetration of another body, wherein the soft component has a lower hardness than the hard component.

In particular, a polymer is used as the soft component, which is resilient or flexible at room temperature. The hard component, on the other hand, is essentially not resilient or flexible.

Common plastics that can be processed thermoplastically, such as PC (polycarbonate), PS (polystyrene), PMMA (polymethyl methacrylate), COP/COC (cycloolefin copolymers), PP (polypropylene), PE (polyethylene), PA (polyamide) and the like are suitable as plastics for the hard component, wherein optically transparent plastic types are preferred.

Common soft plastic components or elastomers that can be processed in the two-component injection molding process, such as thermoplastic elastomers (TPEs), eCOC (elastomeric cycloolefin copolymers), silicones, in particular liquid silicone rubber (LSR), thermoplastic polyurethane elastomers (TPU), and the like, are suitable as plastics for the soft component, wherein optically transparent plastic types are preferred.

According to a preferred embodiment, at least one groove is formed in the hard component, in which the soft component is arranged to form the at least one measuring channel. This gives the measuring channel mechanical stability.

It is also preferably provided that an ergonomic handle is formed on one end of the hard component, which is used for simple insertion of the sensor cassette into a corresponding holder of the analysis module.

The sensor carrier can also be made from a hard component. Conventional thermoplastically processable plastics, such as PC (polycarbonate), PS (polystyrene), PMMA (polymethyl methacrylate), COP/COC (cycloolefin copolymers), PP (polypropylene), PE (polyethylene), PA (polyamide) and the like, are suitable as the plastic for the sensor carrier, wherein optically transparent plastic types are preferred. Polycarbonate is particularly preferred in the context of the invention. The sensor carrier can also be designed in the form of a printed circuit board made of the substrate materials common to electronics for rigid or flexible printed circuit boards (such as fiber-reinforced epoxy resins (e.g. so-called FR4), polyimide (PI), etc.).

According to a preferred embodiment, the sensor carrier and/or the cover part are optically transparent. The transparent design enables visual sample observation and/or air bubble detection. The design in optically transparent plastic material also offers the possibility of simultaneously carrying out further optical measurements on the sample, for example absorption or fluorescence spectroscopy or transmission measurements in the UV-Vis-NIR range for determining other parameters (for example oximetry). Furthermore, the transparent design of the sensor carrier and/or cover part offers the possibility of using combined electrochemical/optical detection methods (such as electrochemiluminescence).

Alternatively, the sample observation, in particular the observation of the sample positioning in the measuring channel and possibly the detection of air bubbles by a conductance or impedance measurement, can be carried out by means of separate electrodes applied to the sensor carrier.

The cover part can be connected to the sensor carrier in different ways, the connection preferably not being able to be released without being destroyed. Another requirement is that the most precise possible mutual alignment of sensor carrier and cover part should be ensured. The connection between the sensor carrier and the cover part can be established by common methods, such as gluing, welding (e.g. thermally, by means of ultrasound, by means of a laser), by means of latching elements, etc. In this context, a preferred embodiment provides that the sensor carrier and the cover part have connecting elements that interact with one another in a form-fitting manner. The form fit can take place, for example, in that the sensor carrier or the cover part carries at least two protruding pins, studs, spikes or the like, which engage in corresponding recesses in the other part.

The form fit enables an automated and very exact centered positioning of the at least one measuring channel above the sensor elements. As a result, in addition to cost savings in production, the size of the sensor elements can be optimally adapted to the width of the measuring channel, without the risk of partial covering or pinching of the sensor elements by the cover part or the sealing lips. This enables multiple and long-term use of the sensor cassette with up to 700 sample measurements or up to 8 weeks of use.

A particularly preferred embodiment of the connection between the sensor carrier and the cover part is achieved by that the connecting elements are brought into positive connection by caulking. The caulking can be carried out as cold or hot caulking. The connection is established in such a way that parts of the soft component of the cover part are pressed against the sensor carrier and thereby compressed, whereby the at least one measuring channel is sealed.

The caulking elements preferably comprise domes arranged on the sensor carrier or on the cover part, which penetrate openings formed on the other part. These openings can be designed in the form of simple bores or can optionally also have expanded areas in which the material of the caulking dome displaced by the plastic deformation is received. The caulking enables a secure, tight and permanent connection of the sensor carrier with the cover part. This joining process can be automated very well, has very short cycle times and is significantly more reliable and long-lasting than, for example, an adhesive process. Another advantage is that the sensor cassette cannot be detached or disassembled without being destroyed. Furthermore, outside the area of the caulking elements, in particular the caulking domes and grooves, there is no impairment of the transparency of the plastic parts by, for example, adhesive streaks, welding beads, etc. The heat exposure zone during the joining can be limited to a narrow area around the caulking domes, thus avoiding thermal stress on the temperature-sensitive active sensor surfaces.

The sensor elements arranged on the sensor carrier are preferably designed as electrochemical sensor elements with an ion-selective electrode, a sensor electrode for amperometric or impedance measurements. These sensor elements are preferably applied, in particular printed, to the sensor carrier using thick-film technology. In particular, the sensor carrier comprises an arrangement of a plurality of ion-selective, amperometric or impedance-based sensor electrodes for the simultaneous measurement of a plurality of ion species, blood gas parameters, metabolites, biomolecules or markers in the form of a sensor array, and at least one reference electrode and optionally a counter electrode. Ion-selective electrochemical sensor types on a thick-film basis for the measurement parameters used here (e.g. Na, K+, Ca++, Cl−, H+, Li+, NH4+, Mg++, etc.) are based on the layered structure known in the literature comprising electrode lead, possibly other electrochemically active materials such as fixed contact materials, ion-electron transducers, mediators, and sensor membranes doped by means of ionophores, ion exchangers or conductive salts.

Amperometric electrochemical sensor types for blood gases, metabolites, and biomolecules are based on the layer-by-layer structure known in the literature comprising electrode lead, possibly other electrochemically active materials such as fixed contact materials, transducers, mediators, enzymes, receptor molecules, cover membranes, etc.

Impedance-based sensor types for biomolecules and other chemical-physical sample parameters are based on the layered structure known from the literature, comprising electrode lead and possibly further modifications and/or specific coatings of the electrode surface with, for example, receptor molecules.

It is preferably provided that in addition to the at least one measuring channel, a reference channel is formed in the cover part, wherein the measuring channel is connected at one end with a first fluid connector provided for the inflow of the sample fluid and at the other end with a second fluid connector provided for the outflow of the sample fluid, and wherein the reference channel at one end is connected to a third fluid connector provided for the inflow of a reference fluid and at the other end leads into the measuring channel. In this case, the reference channel is connected to a reference electrode, the reference electrode being electrically connected to a conductor track which, with regard to the measurement of a voltage between the reference electrode and an ion-selective electrode, serves to tap the voltage. Because the reference electrode opens into the measuring channel, the reference solution mixes with the sample fluid that has already been examined and the outflow of this mixture can take place via a single fluid connector, which ensures a space-saving construction.

It is also preferably provided here that the reference channel opens into an angled section of the measuring channel. In the angled section of the measuring channel, the reference channel thus joins it in the form similar to a Y in order to minimize the overall space requirement of the channel system and the total area of the sensor cassette.

Another preferred embodiment variant is based on the use of at least one reference electrode which is arranged directly in the measuring channel and which does not require a separate reference fluid or separate reference channel. Such reference electrodes are based, for example, on the electrode structure known from the literature comprising a metal/metal salt combination, possibly in conjunction with a salt reservoir which is applied to the electrode surface in a gel or a swellable polymer matrix.

According to a further aspect, the invention provides a device for carrying out in particular electrochemical measurement processes in sample fluids, comprising an inventive sensor cassette and an analysis module having at least one cassette holder for receiving the sensor cassette, wherein the sensor cassette in its state received in the cassette holder is movable along a movement path between a first and a second position, wherein the sensor cassette is fluidly and electrically separated from the analysis module in the first position and is fluidly and electrically connected to the analysis module in the second position. By providing a cassette holder, the sensor cassette can first be inserted or pushed into the holder and then moved to a position in which the fluidic and electrical connection or contacting of the sensor cassette with the analysis module takes place. The separation of the insertion or slide-in movement achieved thereby from the movement of the sensor cassette leading to the contacting ensures that the contacting takes place at the end of a defined movement path and therefore under defined conditions in which the sensor cassette is moved from the first to the second position.

In connection with the fluidic and electrical contacting of the sensor cassette, a preferred embodiment provides that the analysis module comprises at least one, preferably spring-mounted, fluidic connection element, which can be brought into fluidic connection with the at least one fluid connector of the sensor cassette designed as a counter-element, and that the analysis module comprises a plurality of electrical contact elements which can be brought into electrical connection with contact regions of the conductor tracks of the sensor cassette which contact regions are left free by the cover part. In particular, the fluid connector formed in the two-component injection-molded cover part and realized by the soft component can be designed in the form of a centering seal to ensure a secure and tight connection with the correspondingly simple designed connecting elements on the side of the analysis module. Due to the preferably provided resilient mounting of the at least one connecting element, the at least one fluidic connecting element can exert a largely constant pressing force on the liquid connection of the sensor cassette, which is independent of the exact position of the sensor cassette. In this way, slight deviations in position of the sensor cassette and/or manufacturing tolerances of the sensor cassette can be compensated for.

It is particularly preferably provided that the fluidic and the electrical connection can be established by moving the sensor cassette along the movement path. This means, for example, that the engagement of the at least one fluid connector of the sensor cassette into the fluidic connection element of the analysis module takes place through the movement along the movement path. With regard to the establishment of the electrical connection, this takes place, for example, in that the electrical contact elements are formed by contact pins which are resilient in the direction of movement along the movement path.

If, as also corresponds to a preferred embodiment, the movement path or a movement component thereof runs essentially transversely or perpendicularly to the plane of the planar sensor carrier, the fluidic and electrical contacting can take place on the same side of the essentially planar sensor cassette, i.e. on the upper or on the underside of the sensor cassette.

The tightness of the fluidic connection can be ensured by the soft sealing component contained in the fluid connectors of the sensor cassette and the reliable electrical contacting can be ensured by means of appropriate spring contacts attached to the analysis module. This arrangement of the fluidic and electrical connectors enables a correspondingly compact construction and favors the space-saving, universal installation of such modules in larger measuring devices and analysis systems.

According to a preferred embodiment, the cassette holder interacts with a bearing or guide in order to be displaced along the movement path together with the sensor cassette received therein.

In particular, the cassette holder can be pivotally mounted in order to pivot the sensor cassette from the first position to the second position along the movement path. The fluidic and electrical contacting of the sensor cassette takes place by a swiveling or tilting movement by pressing the connectors against the analysis module.

The analysis module preferably comprises a locking element which interacts with the cassette holder in order to fix the cassette holder in the second position of the sensor cassette. The locking can be achieved by various simple mechanisms, such as ball catch, sliding cover and the like.

In order to be able to apply the forces required for pressing the sensor cassette onto the connecting elements of the analysis module, it is preferably provided that the cassette holder comprises at least one holding element which forms a stop for the sensor cassette which is effective transversely to the movement path.

At the same time, the at least one holding element can form a guide for inserting the sensor cassette into the cassette holder transversely to the movement path.

For the further processing of the electrical signals obtained from the sensor cassette, it is preferably provided that the analysis module comprises an electronic circuit for amplifying and/or the analog-to-digital conversion of the signals tapped via the electrical contact elements. In particular, a separate preamplifier circuit and/or ADC circuit is provided in the analysis module for each ion-selective electrode of the sensor cassette. By providing separate amplifier circuits and/or ADC circuits in the analysis module, all measurement parameters can be measured in the immediate vicinity of the sensor cassette or the cassette holder simultaneously and with little interference.

Figure 3:
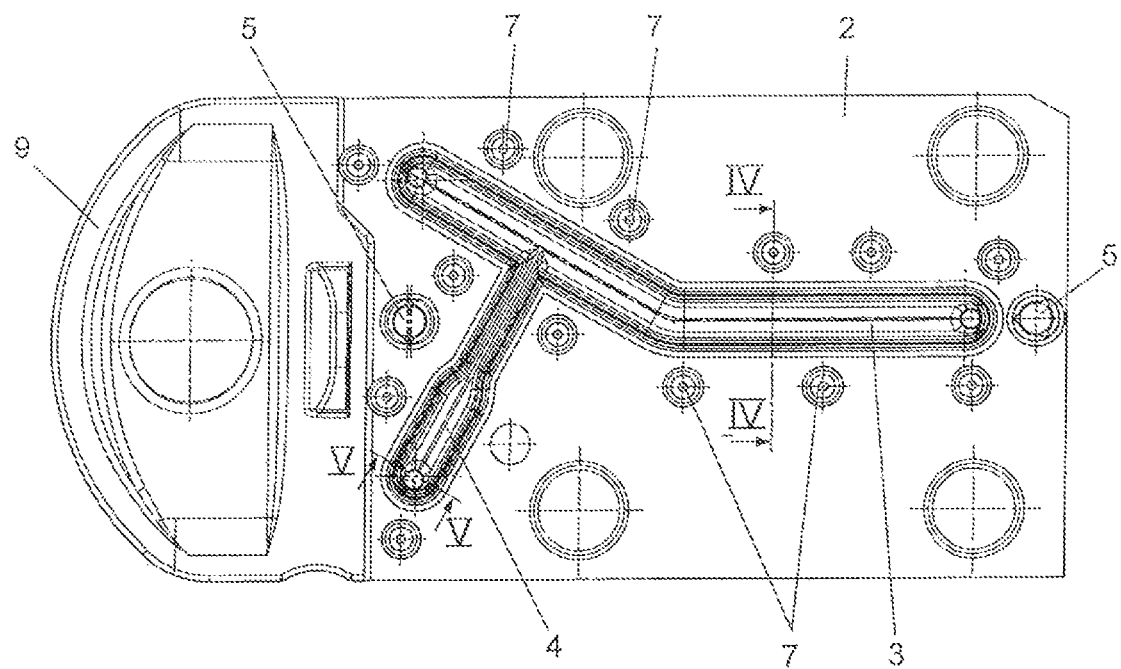
Figure 4:
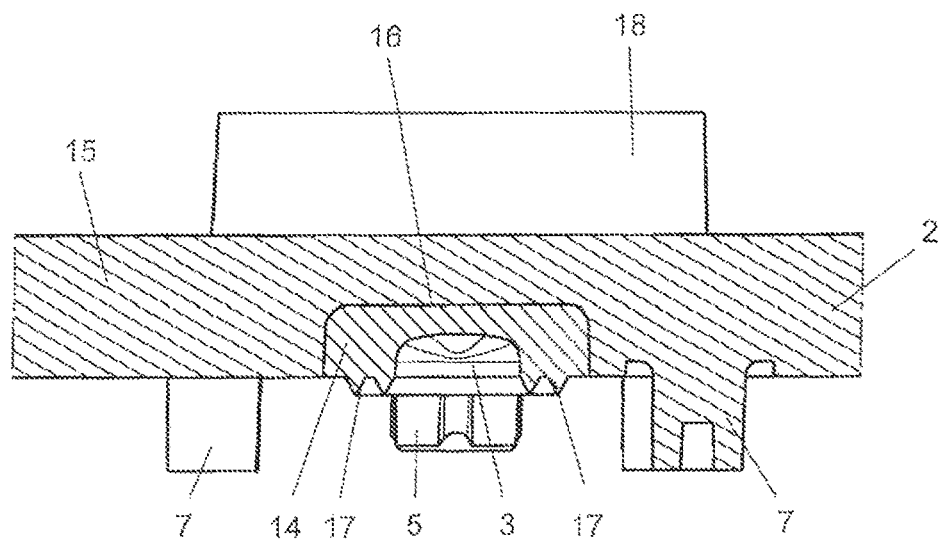

The invention is explained in more detail below on the basis of exemplary embodiments schematically illustrated in the drawing. In the drawing, FIG. 1 shows a perspective view of the sensor cassette in an exploded view, FIG. 2 shows a perspective view of the sensor carrier of the sensor cassette, FIG. 3 shows a plan view of the cover part of the sensor cassette, FIG. 4 shows a sectional view according to arrow IV-IV of FIG. 3, FIG. 5 a sectional view according to the arrow V-V in FIG. 3, FIG. 6 a detailed view of a form-fit connection between the sensor carrier and the cover part, FIG. 7 a perspective view of the analysis module with the cassette holder in the swung-open state, FIG. 8 a view corresponding to FIG. 7 with the cassette holder being removed and FIG. 9 a perspective view of the analysis module with the sensor being received in the cassette holder in the connected state.

FIG. 1 shows a sensor cassette, the essentially planar sensor carrier of which is designated by 1. The sensor elements of the sensor carrier are arranged on the underside, which is not visible in FIG. 1. In the ready-to-use or assembled state of the sensor cassette, the sensor carrier 1 is attached with its underside on the top of the cover part 2. In FIG. 1 the sensor carrier 1 and the cover part 2 are shown in a spaced apart position for the sake of clarity. A measuring channel 3 and a reference channel 4 are formed in the cover part 2 on the side facing the sensor carrier 1.

For the mutual alignment of the sensor carrier 1 and the cover part 2, the cover part carries two alignment pins 5 protruding in the direction of the sensor carrier 1, which plunge into openings 6 of the sensor carrier 1 in the assembled state of the sensor cassette. The form-fitting connection of the sensor carrier 1 to the cover part 2 takes place with the aid of a large number of caulking domes 7, which penetrate openings 8 of the sensor carrier 1. In FIG. 1, a handle region 9 bent out of the plane of the cover part 2 can also be seen.

Figure 2:
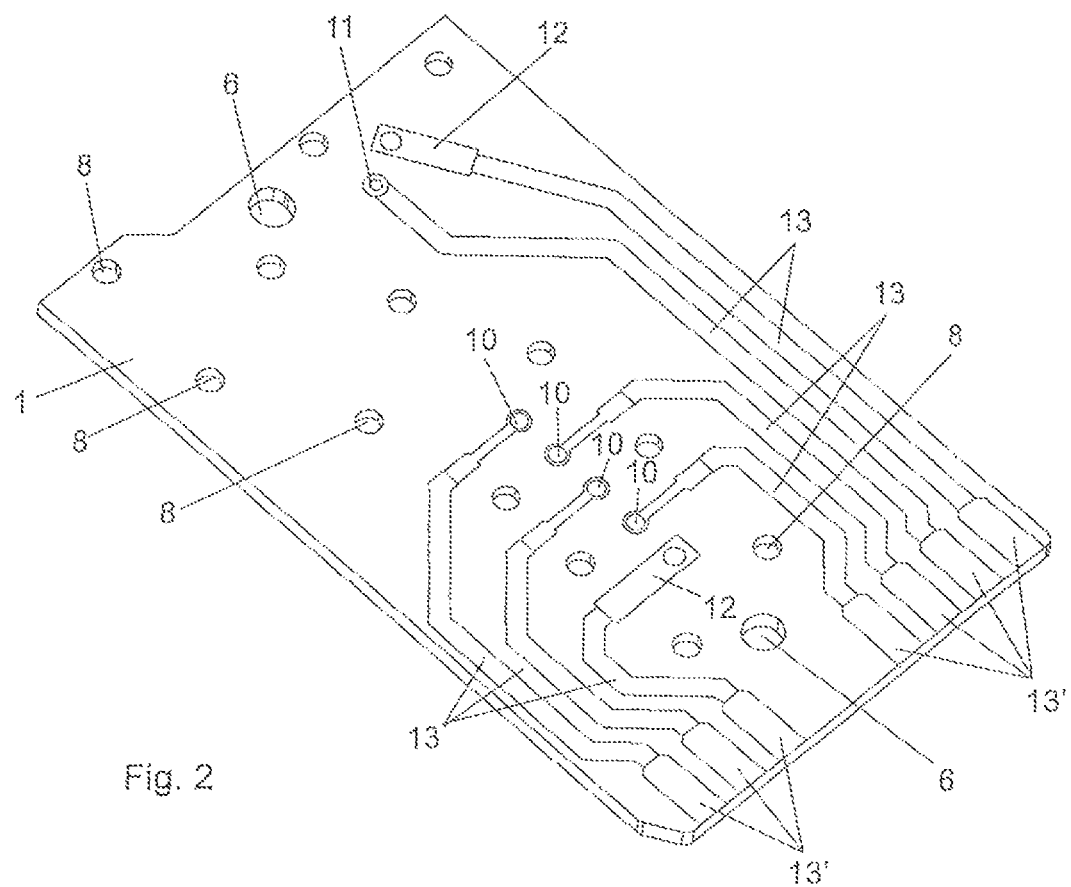

FIG. 2 shows the underside of the sensor carrier 1. It can be seen that the sensor carrier carries a plurality of sensor elements 10 which comprise ion-selective electrodes arranged along the measuring channel 3 and which are wetted by the sample fluid flowing through the measuring channel 3. Furthermore, a reference electrode 11 is provided, which is wetted by the reference solution supplied via the reference channel 4. Furthermore, conductance contacts 12 are provided. The ion-selective electrodes of the sensor elements 10, the reference electrode 11 and the conductance contacts 12 are connected via conductor tracks 13 to electrical contact regions 13', via which a voltage tap takes place. The electrical contact regions 13' are arranged in an edge area of the sensor carrier 1, which is not covered by the cover part 2 in the assembled state of the sensor cassette.

Figure 5:
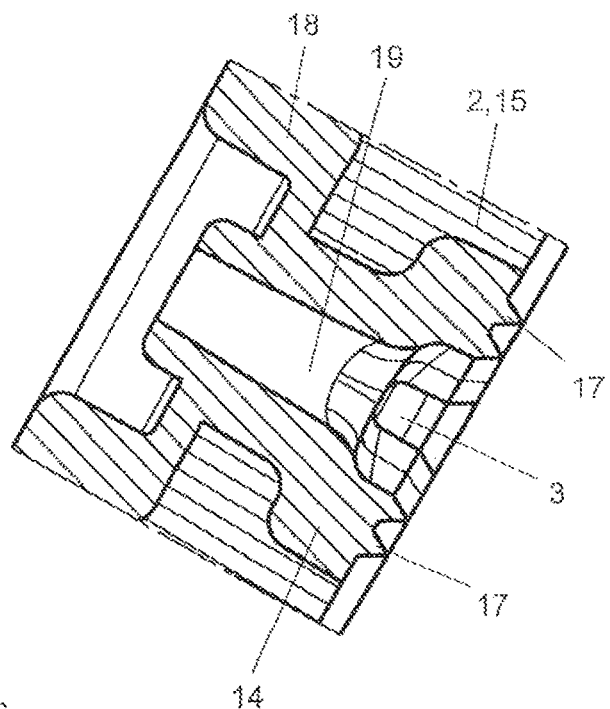

FIG. 3 shows the section lines IV-IV and V-V for the cross-sectional representations shown in FIGS. 4 and 5. FIG. 4 is a cross section of the measuring channel 3, wherein it can be seen that the channel is formed in a soft component 14 of the cover part 2. The remaining body of the cover part consists of a hard component 15. The hard component 15 has a groove-shaped recess 16 which follows the course of the measuring channel 3 and serves to accommodate the soft component 14. An analog design is provided in connection with the reference channel 4. The soft component 14 also forms sealing lips 17 which protrude laterally from the measuring channel 3 from the plane of the cover part 2 in the direction of the sensor carrier.

FIG. 5 shows the cross section of the cover part 2 in the region of a fluid connector 18 formed on the rear side of the cover part 2. Fluid connectors are arranged at all three ends of the channels 3, 4. The fluid connector 18 shown in FIG. 5 is formed from the soft component 14 and is therefore formed in one piece both with the material forming the measuring channel 3 and with the sealing lips 17. The fluid connector 18 is connected to the measuring channel 3 via a connecting channel 19 formed in the soft component 14.

Figure 6:
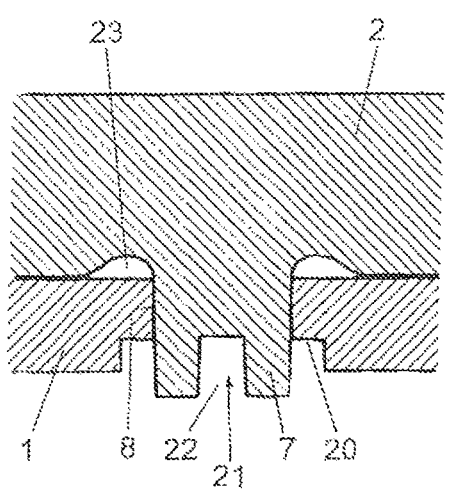

The fastening of the cover part 2 on the sensor carrier 1 by caulking is explained in more detail with reference to FIG. 6. The caulking dome 7 of the cover part 2 passes through the opening 8 of the sensor carrier 1. The opening 8 has an enlarged area 20, in which the material of the caulking dome 7 displaced by the caulking process or the plastic deformation is received. For this purpose, a caulking tool is inserted in the direction of arrow 21 into the front opening 22 of caulking dome 7 and plastic deformation is brought about by applying a large force. In order to reduce stress peaks in the region of the beginning of the caulking dome 17, a rounding 23 is formed there in the manner of an axial recess.

Figure 7:
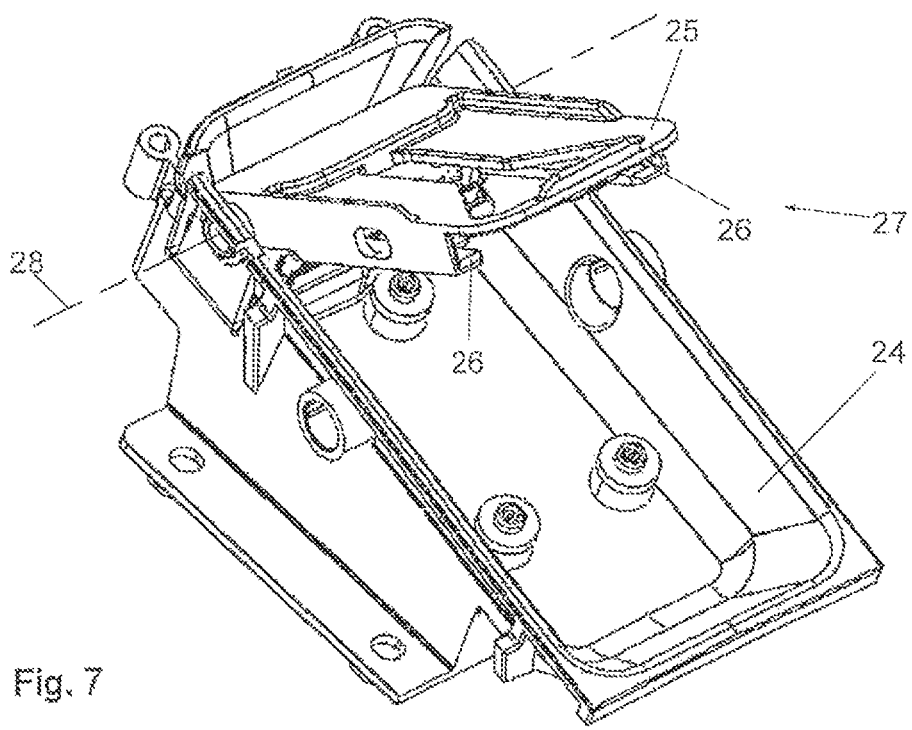

FIG. 7 shows an analysis module 24, which comprises a pivotably mounted cassette holder 25. Guide elements 26 arranged on both sides of the cassette holder 25 define an area into which the sensor cassette can be inserted in the direction of the arrow 27. The pivot axis of the cassette holder 25 is designated 28.

Figure 8:
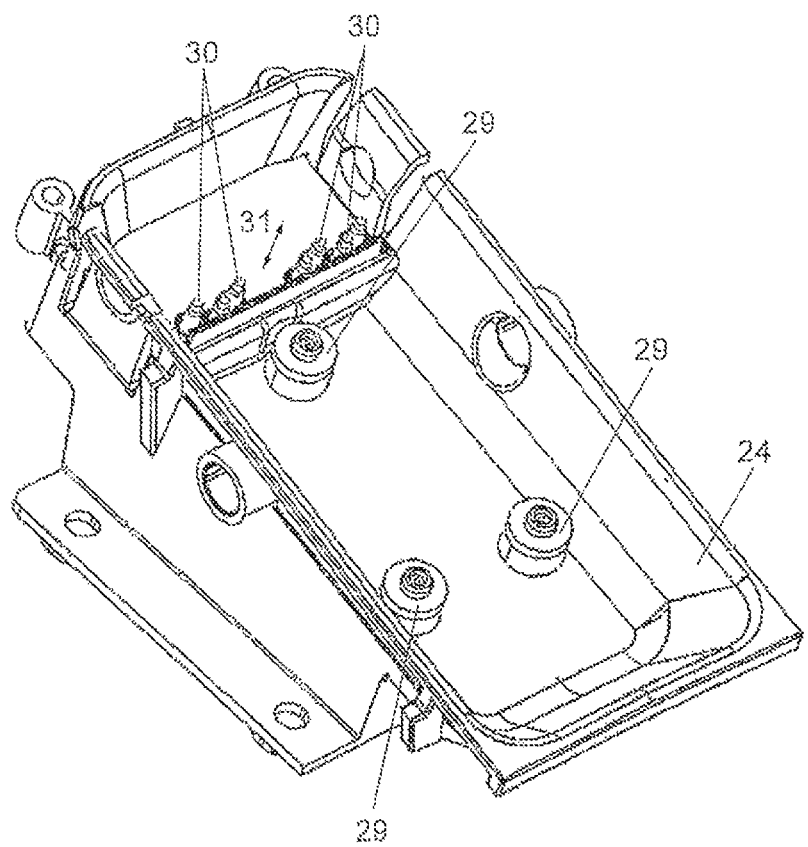
Figure 9:
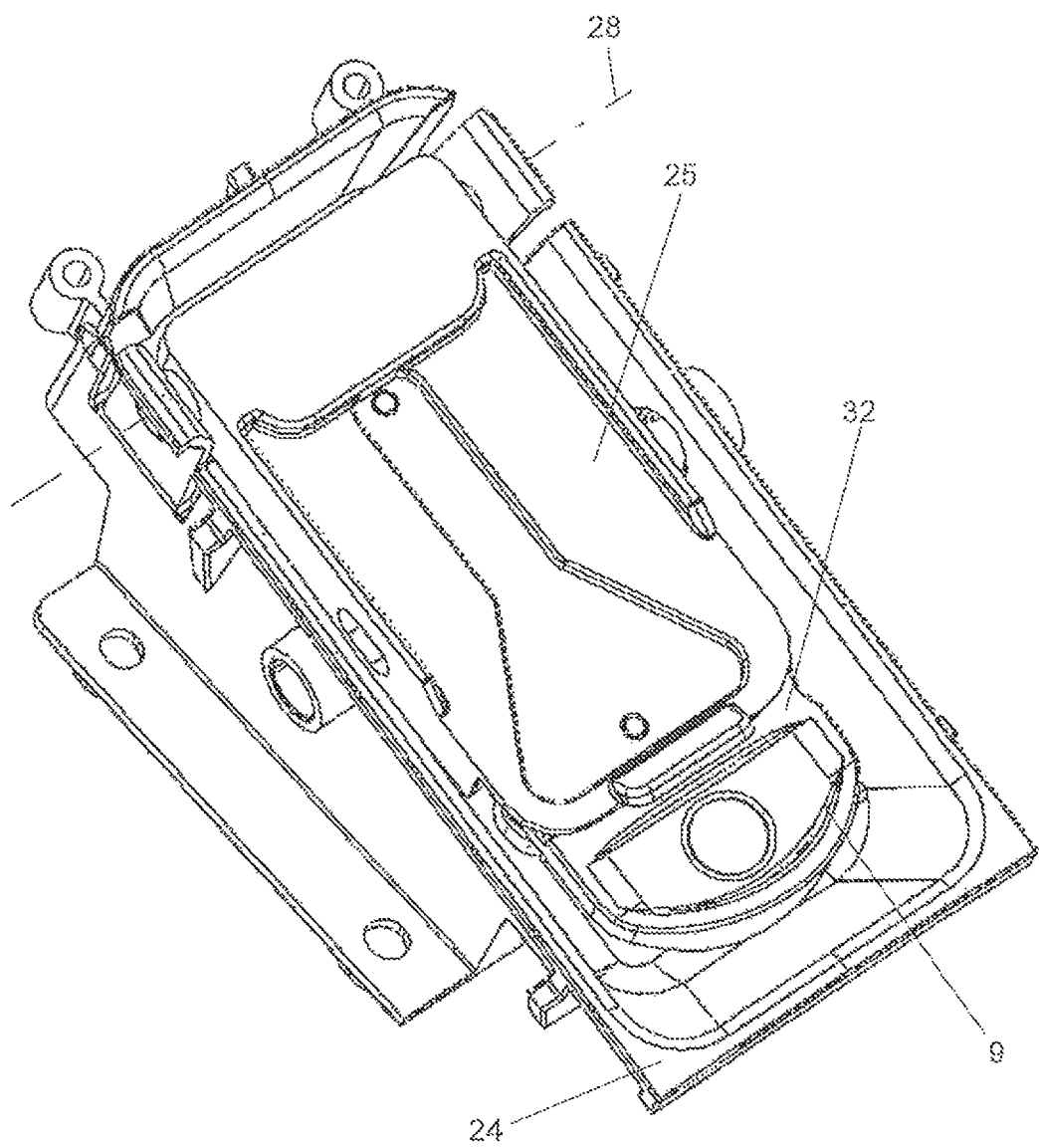

The connection elements of the analysis module, which establish the fluidic and electrical connection of the sensor cassette with the analysis module 24, can be seen better in FIG. 8. Three fluidic connecting elements 29 are provided, which are designed to cooperate with the fluid connectors 18 of the sensor cassette, a plug connection being produced here essentially. The electrical connecting elements are designed in the form of contact pins 30, which are held so as to be resiliently movable in the direction of the double arrow 31.

To connect a sensor cassette 32 to the analysis module 24, it is pushed in as far as possible in the pivoted-up position of the cassette holder 25 shown in FIG. 7 in the direction of the arrow 27. Thereafter, the cassette holder 25 together with the sensor cassette 32 is pivoted downward about the pivot axis 28 until the fluid connectors 18 are pressed into the fluidic connecting elements 29 and the electrical contact regions 13' of the sensor carrier 1 are pressed against the contact pins 30. In this position shown in FIG. 9 the cassette holder 25 is locked by locking elements, not shown, so that the sensor cassette 32 remains in the state connected to the analysis module 24 until the lock is released and the cassette holder 25 is swung open again.

Figure 10:
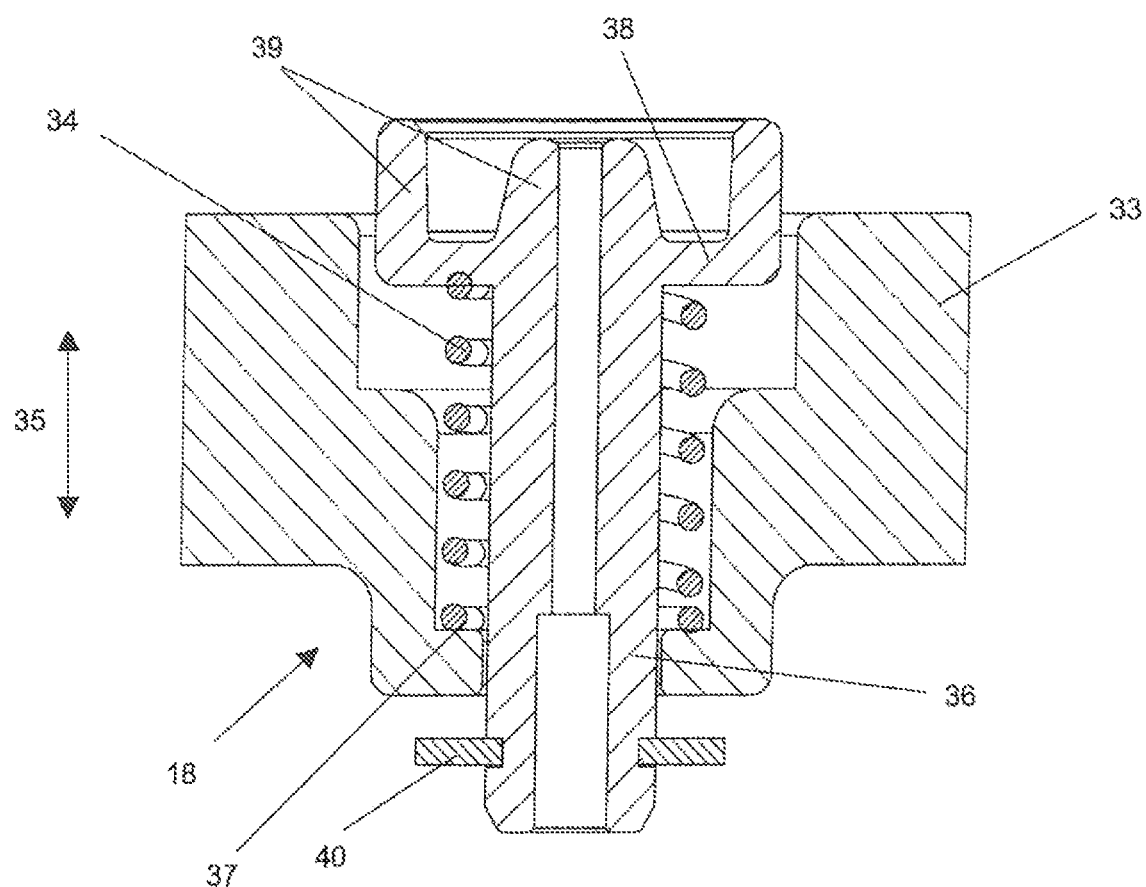

FIG. 10 shows a fluidic connecting element 29 according to a preferred embodiment in section. The connecting element 29 has a guide body 33 for a connecting pin 36 which is spring-mounted against the action of a spring 34 in the direction of the double arrow 35. The spring 34 is supported on the one hand against a shoulder 37 in the guide body 33 and on the other hand against the rear side of the connecting plate 38 of the connecting pin 36. Annular guide walls 39 for receiving a fluid connector 18 project over the connecting plate 38. A safety stop is labeled 40. The connecting pin 36 can sink in resiliently when a sensor cassette is inserted, thereby providing a largely constant contact pressure of the fluidic connecting element 29 against the fluid connector 18.

Figure 11:
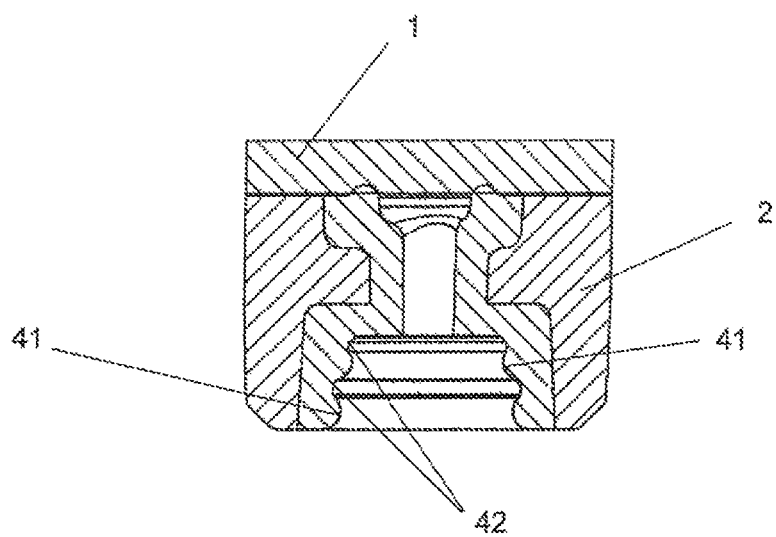

It can be seen in FIG. 11 that, according to a preferred embodiment of the present invention, the fluid connector 18 can be shaped to form at least one internal annular sealing element 41 or sealing ring 41. This is achieved by the formation of correspondingly shaped undercuts 42 on the inner wall of the fluid connector 18.

The invention claimed is:

1. A sensor cassette insertable into an analysis module for carrying out measurement processes in sample fluids, comprising:
   a sensor carrier which is essentially planar and carries a plurality of sensor elements for determining chemical and/or physical parameters of the sample fluids, which sensor elements are connected to conductor tracks formed on the sensor carrier, and
   a cover part arranged on the sensor carrier, in which at least one groove-shaped measuring channel that opens towards the sensor carrier is formed,
   which the at least one groove-shaped measuring channel;
      is intended for the flow of the sample fluid,
      is connected to at least one sensor element of the sensor carrier and
      is fluidly connected to at least one fluid connector arranged on the side facing away from the sensor carrier,
   wherein the cover part is designed as a two-component injection molded part comprising a hard component and a soft component, wherein the at least one groove-shaped measuring channel is formed in the soft component over its entire length, wherein the soft component forms the at least one fluid connector, the at least one groove-shaped measuring channel and the at least one fluid connector being formed in one piece with one another.

2. The sensor cassette according to claim 1, wherein the soft component comprises sealing lips cooperating with the sensor carrier for sealing the at least one groove-shaped measuring channel.

3. The sensor cassette according to claim 1, wherein at least one groove is formed in the hard component, in which the soft component is arranged to form the at least one groove-shaped measuring channel.

4. The sensor cassette according to claim 1, wherein the sensor carrier and the cover part have connecting elements that interact with one another in a form-fitting manner.

5. The sensor cassette according to claim 4, wherein the connecting elements are brought into positive connection by caulking.

6. The sensor cassette according to claim 4, wherein the connecting elements comprise domes arranged on the sensor carrier or on the cover part, which domes penetrate openings formed on the other part.

7. The sensor cassette according to claim 1, wherein the sensor carrier and/or the cover part are optically transparent.

8. The sensor cassette according to claim 1, wherein in addition to the at least one groove-shaped measuring channel, a reference channel is formed in the cover part, wherein the at least one groove-shaped measuring channel is connected at one end with a first fluid connector provided for the inflow of the sample fluid and at the other end with a second fluid connector provided for the outflow of the sample fluid, and the reference channel at one end is connected to a third fluid connector provided for the inflow of a reference fluid and at the other end leads into the at least one groove-shaped measuring channel.

9. The sensor cassette according to claim 8, wherein the reference channel opens into an angled section of the at least one groove-shaped measuring channel.

10. Device for carrying out measurement processes in sample fluids, comprising a sensor cassette according to claim 1 and an analysis module having at least one cassette holder for receiving the sensor cassette, wherein the sensor cassette in the state received in the cassette holder is movable along a movement path between a first and a second position, wherein the sensor cassette is fluidly and electrically separated from the analysis module in the first position and is fluidly and electrically connected to the analysis module in the second position.

11. The device according to claim 10, wherein the analysis module comprises at least one fluidic connection element, which can be brought into fluidic connection with the at least one fluid connector of the sensor cassette designed as a counter-element, and wherein the analysis module comprises a plurality of electrical contact elements which can be brought into electrical connection with contact regions of the conductor tracks of the sensor cassette which contact regions are left free by the cover part.

12. The device according to claim 10, wherein the fluidic and the electrical connection can be established by moving the sensor cassette along the movement path.

13. The device according to claim 11, wherein the electrical contact elements are formed by contacting pins which are resilient in the direction of movement along the movement path.

14. The device according to claim 10, wherein the cassette holder interacts with a bearing or guide in order to be displaced along the movement path together with the sensor cassette received therein.

15. The device according to claim 14, wherein the cassette holder is pivotally mounted in order to pivot the sensor cassette long the movement path from the first position to the second position.

16. The device according to claim 10, wherein the analysis module comprises a locking element which interacts with the cassette holder in order to fix the cassette holder in the second position of the sensor cassette.

17. The device according to claim 10, wherein the cassette holder has at least one holding element which forms a stop for the sensor cassette which is effective transversely to the movement path.

18. The device according to claim 17, wherein the at least one holding element forms a guide for inserting the sensor cassette into the cassette holder transversely to the movement path.

19. The device according to claim 10, wherein the analysis module has an electronic circuit for amplification and/or analog-digital conversion of the signals tapped via the electrical contact elements.

* * * * *